United States Patent
Carter et al.

(10) Patent No.: US 6,266,782 B1
(45) Date of Patent: Jul. 24, 2001

(54) APPARATUS AND METHODS FOR INBAND PROTOCOL CORRECTION IN DISTRIBUTED OBJECT NETWORKING

(75) Inventors: George E. Carter, Santa Clara; Shmuel Shaffer, Palo Alto, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/201,344

(22) Filed: Nov. 30, 1998

(51) Int. Cl.$^7$ .................................................. H02H 3/05
(52) U.S. Cl. .......................... 714/4; 709/228; 709/230; 370/467
(58) Field of Search .................................. 714/4, 3, 2, 1; 709/203, 201, 200, 220, 221, 228, 230; 707/10; 370/401, 465, 466, 467, 469

(56) References Cited

U.S. PATENT DOCUMENTS

| | | | |
|---|---|---|---|
| 5,392,425 | 2/1995 | Elliott et al. | |
| 5,396,505 | 3/1995 | Freeman et al. | |
| 5,481,548 | * 1/1996 | Wallace | 714/712 |
| 5,640,394 | 6/1997 | Schrier et al. | |
| 5,727,152 | * 3/1998 | Coolegem et al. | 709/215 |
| 6,026,080 | * 2/2000 | Roy | 370/260 |
| 6,157,635 | * 12/2000 | Wang et al. | 370/352 |

OTHER PUBLICATIONS

Higaki, Hiroaki and Takizawa, Makoto, Group Communication Protocol for Flexible Distributed Systems, 1996, pp. 48–55.*

Perlas, Harvey, Jost and Mato, The New Implementation of the Event Building Protocol for the Aleph Data Acquisition System, Feb. 1994, pp. 236–238.*

* cited by examiner

Primary Examiner—Robert Beausoleil
Assistant Examiner—Rita Ziemer (57) ABSTRACT

Apparatus and methods for correcting protocol errors in computer networking software. More particularly, an apparatus and methods are provided for correcting a class of protocol errors that is compatible with the protocol suite being used in computer networking software. The present invention performs inband protocol correction in a single phase or in multiple phases, according to some specific embodiments.

20 Claims, 7 Drawing Sheets

APPARATUS AND METHODS FOR INBAND PROTOCOL CORRECTION IN DISTRIBUTED OBJECT NETWORKING

BACKGROUND OF THE INVENTION

The present invention generally relates to correction of protocol errors in computer networking software, and more particularly, to an apparatus and methods for correcting a class of protocol errors that is compatible with the protocol suite being used in computer networking software for, e.g., a local area network (LAN).

As packet-based communications networks have been in use for many years, computer networking software has evolved to the point where the networking protocol stacks have become very large and complex. In particular, the networking protocol stack of a computer networking software product that extensively employs the latest distributed object networking techniques can be so large and complex that significant errors and critical omissions in the networking protocol stack are likely to occur. Examples of computer networking software products with large networking protocol stacks are T.120 user application programs for the relatively new telephony-over-LAN (ToL) systems, such as H.323 systems. H.323 and T.120 protocols are discussed herein merely as exemplary networking protocols.

Resolving the issues created by such networking protocol stack errors in modern computer networking software products is increasingly important to the system builder who desires to overcome the problems introduced by the large size of today's networking protocol stacks and by modern distributed networking technologies.

Although a variety of approaches have been conventionally used by system builders to try to resolve the issues related to these networking protocol stack errors, these approaches have drawbacks or are insufficient for modern networking technologies and the increasingly large networking stacks. A first approach has been to evaluate competitive vendors of networking software products and then choose that vendor with the networking software product having the fewest number of problems or bugs related to networking protocol stack errors (also referred to herein as protocol bugs). However, this approach of selecting among vendors may be limited, especially since there may only be a small number of vendors for many of the most leading edge networking protocol stacks. As an example, at present there is one vendor of the complete T.120 stack on the personal computer (PC) platform for ToL systems, with several other vendors offering only restricted access to part of the functionality of the T.120 stack or one derived from it. As another example, products for the H.323 networking protocol stack have only a few more vendors than T.120 since these stacks have become so large and labor intensive to create that very few companies find entering this ToL business an attractive prospect. A second approach, which may be used in addition to the first approach, is to work with a selected vendor to get that vendor to correct such protocol bugs in the networking software product. However, this approach may be problematic since the vendor may not be very responsive in correcting such bugs. Moreover, when there are fewer numbers of vendors, the selected vendors may be less responsive to the system builder customer in part due to the scarcity or lack of alternative vendors that may be used. In a market of few vendors, the selected vendor may not be overly responsive to the system builder customer's demands for error correction since the system builder customer as merely one of many customers has only diluted influence on the selected vendor's actions. In addition, the selected vendor may be less responsive to the system builder customer if the vendor is a competitor in some markets. A third approach, which may be used in addition to the first and/or second approaches, is to simply eliminate those features in the networking software product that may depend on any protocol bugs in the networking software product. The disadvantage of this approach is that eliminating functionality that depends on a broken part of the protocol stack in distributed object networks can severely restrict the features offered to the end user. A fourth approach is for the system builder to implement the networking protocol stack on its own rather than buying a networking software product from a vendor. Although this approach allows the system builder to fix protocol bugs regarded as important in a more timely manner, the system builder would incur high costs in both manpower and time to develop its own networking protocol stack. For example, developing a networking protocol stack such as T.120 or H.323 could take an extended amount of time, incur extremely high development and labor costs, and possibly incur other costs such as maintaining a presence on international standards setting committees.

Therefore, if a protocol stack has defects, system builders have had to and will continue to resort to the above-described conventional approaches which have some disadvantages for modern networking software products with large network protocol stacks. Thus, it is desirable to have alternative and/or supplemental techniques for resolving network protocol stack errors in modern computer networking software products.

SUMMARY OF THE INVENTION

The present invention relates to apparatus and methods for correction of protocol errors in computer networking software, and more particularly, to an apparatus and methods for correcting a class of protocol errors that is compatible with the protocol suite being used in computer networking software.

In accordance with a specific embodiment, the present invention provides a method of correcting a protocol error in a computer networking protocol stack used in a communication connection across a network between a first node and a second node. The method includes establishing a data channel for use as a protocol error correction channel across the network, generating a protocol error correction message to correct the protocol error, and sending the protocol error correction message over the data channel to the second node. The method also includes steps of receiving the protocol error correction message at the second node, and sending a protocol error correction response message to the first node to inform the first node of a status of the protocol error.

In accordance with another specific embodiment, the present invention provides a system for correcting a protocol error in a computer networking protocol stack used in a network including a first node and a second node. The system includes a data channel established for use as a protocol error correction channel. The data channel is inband to the computer networking protocol stack. The system also includes first computer-readable program code for generating and sending a protocol error correction message from the first node to the second node over the data channel when a protocol notification signal is not issued at the second node. The protocol notification signal is part of the computer networking protocol stack. The system further includes second computer-readable program code intercepting the protocol notification signal when the protocol notification signal is determined to be issued in error, and computer-readable media for storing the first and second computer-readable program code.

These and other specific embodiments of the present invention will be readily understood with reference to the following specification and attached drawings.

DETAILED DESCRIPTION OF SPECIFIC EMBODIMENTS OF THE INVENTION

The present invention provides advantages over the conventional approaches to protocol correction. One advantage of the present invention is that protocol correction does not depend on the existence of alternative vendors or on the responsiveness of a third party. Another advantage is that potentially important features that relate to protocol errors do not need to be deleted with use of the present invention, especially because delivering systems with expanded feature sets can be critical in many markets. Further, the present invention provides an economic and efficient way to correct protocol errors in computer networking software using complex protocol stacks, without having to develop an expensive independent protocol stack in a time-intensive manner.

The present invention relates to apparatus and methods for correcting network protocol stack errors using a protocol correction channel, preferably an inband protocol correction channel. Specific embodiments of the present invention are further described in the context of distributed object networking in an exemplary network system of FIG. 1, such as an H.323/T.120 system. However, it is to be understood that the present invention may be used with a variety of different network protocols and in the context of distributed or non-distributed object networking environments.

As mentioned above, FIG. 1 shows an exemplary network system 10, such as an H.323/T.120 protocol system. In particular, LAN system 10 includes a local area network 15. A telephony-over-LAN (ToL) server 17 is coupled to LAN 15, and a private branch exchange (PBX) 19 via an H.323 gateway 14 is optionally coupled to LAN 15. Connected via gateway 14 to LAN 15, PBX 19 also interfaces with known telephones 16 and 18, which may be digital or analog telephones or other telephony devices such as fax machines and the like. Both PBX 19 and ToL server 17 can provide interconnection to a circuit switched network such as the public switched telephone network (PSTN) or ISDN network. The ToL server 17 can perform switching and control functions and other traditional LAN server functions. As indicated in dotted line, ToL server 17 can also include both H.323 gateway functionality 27 and H.323 gatekeeper functionality 29. In other specific embodiments, gateway functionality 27 and gatekeeper functionality 29 can be located as separate hardware devices (shown within dotted line of server 17), with gatekeeper functionality 29 being in a gatekeeper device coupled to LAN 15 and with an H.323 gateway functionality being in a gateway device coupled to LAN 15, to the gatekeeper device and to the PSTN. Also coupled to the local area network 15 may be one or more H.323 client devices, such as computers 21 and 23 and one or more telephony devices 25, having appropriate H.323 interfaces to LAN 15, as described further below with FIG. 2. The telephony device 25 may be an H.323 telephone, and the computers 21 and 23 may include expansion boards for communicating using the H.323 standard over the LAN 15. The H.323 client devices like computers 21 and 23 include hardware and software to provide a user interface for telephony applications. The H.323 client devices may communicate to each other by sending packets over LAN 15, with gatekeeper functionality 29 optionally providing H.323-related control functions. As described above, an H.323 network may be configured to include several different devices. For example, the network may include a terminal for enabling users connected to a LAN to speak, a terminal for enabling a caller resident on the LAN to call a second user through the public switched telephone network, and other terminals such as a wireless telephone with an adaptor to the LAN.

Figure 2:
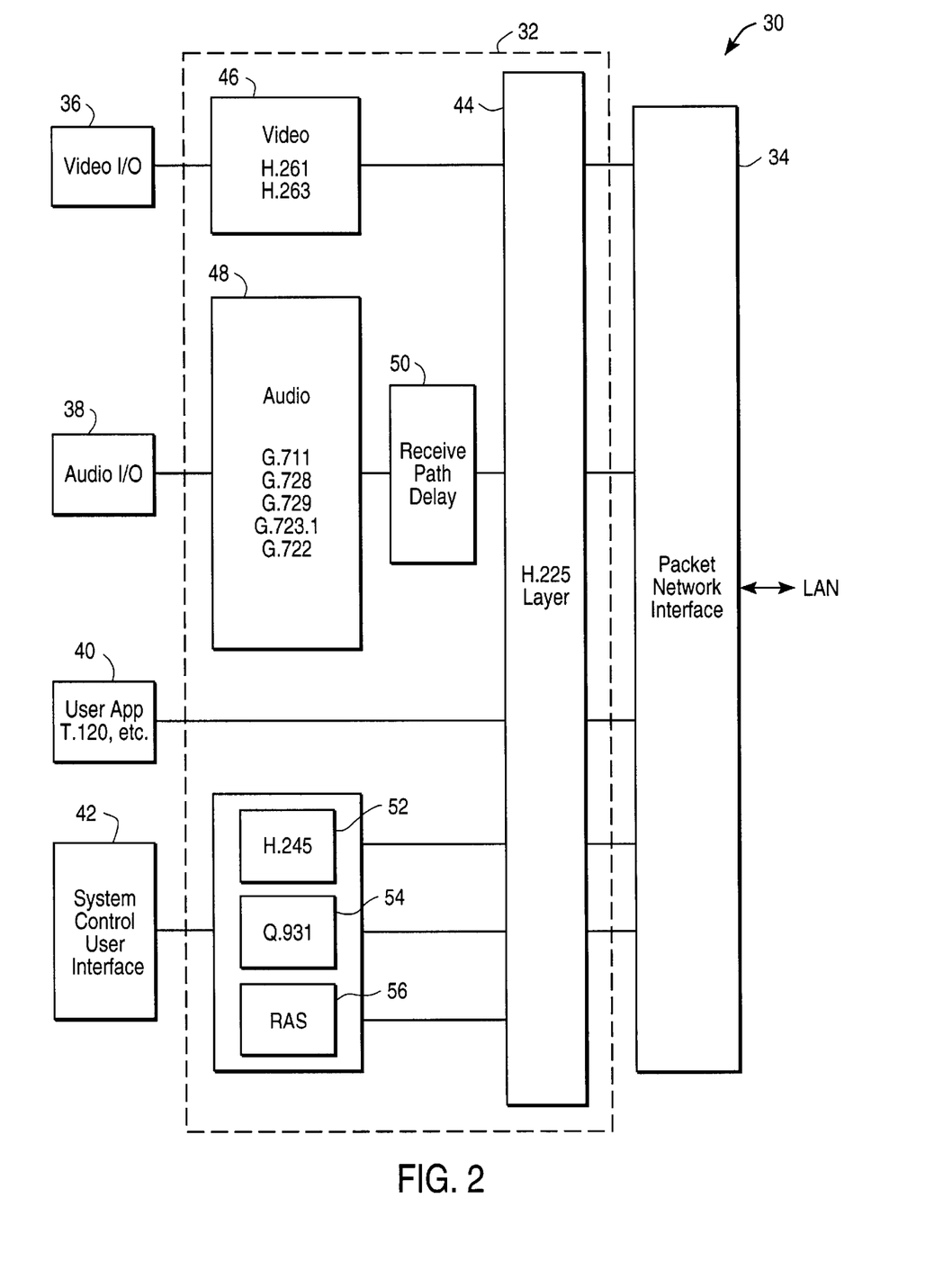
FIG. 2 illustrates a logical diagram of the interface portion of an H.323 client device to a LAN, in accordance with a specific embodiment.

In accordance with a specific embodiment, FIG. 2 illustrates a logical diagram of the interface portion 30 of an H.323 client device to LAN 15. Interface portion 30 includes a known network terminal/device 32 utilizing the International Telecommunication Union (ITU-T) H.323 standard protocol, which is hereby incorporated by reference. Interface portion 30 also includes a packet network interface 34 that is coupled to network terminal 32. Network interface 34 couples the H.323 client device to LAN 15. H.323 terminals/devices and equipment carry real-time voice, video and/or data. It should be noted that H.323 is an umbrella recommendation that sets standards for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The network terminal 32 is coupled to a video input/output (I/O) interface 36, an audio I/O interface 38, an user application interface 40, and a system control user interface (SCUI) 42. Network terminal 32 also includes an H.225 layer 44, a video coder/decoder (codec) 46, an audio codec 48, receive path delay logic 50, H.245 protocol functionality 52, Q.931 protocol functionality 54, and RAS protocol functionality 56.

As seen in FIG. 2, video I/O interface 36 which may be part of the standard H.323 device, connects to a video coder/decoder (codec) 46 such as an H.261 codec for encoding and decoding video signals. Coupled between video I/O interface 36 and H.225 layer 44, video codec 46 translates encoded video signals to H.225 protocol signals. Although the H.261 codec can be the video codec used for an H.323 terminal, other video codecs, such as H.263 codecs and others, may also be used for encoding and decoding video.

Audio I/O interface 38, which may be part of a standard H.323 terminal, connects to the audio codec 48, such as a G.711 codec, for encoding and decoding audio signals. Coupled to audio I/O interface 38, audio codec 48 is coupled to H.225 layer 44 via receive path delay logic 50 and translates audio signals to H.225 protocol signals. Although the G.711 codec is the mandatory audio codec for an H.323 terminal, other audio codecs, such as G.728, G.729, G.723.1, G.722 etc. may also be used for encoding and decoding speech. G.723.1 is a preferred codec because of its reasonably low bit rate, which enables preservation of link bandwidth, particularly in slower speed network connections.

SCUI 42 provides signaling and flow control for proper operation of the H.323 terminal. In particular, all non-audio and non-video control signaling is handled by SCUI 42. Coupled to SCUI 42 are H.245 layer 52, Q.931 layer 54 and RAS layer 56, which each couple to H.225 layer 44. Thus, SCUI 42 interfaces to the H.245 standard which is the media control protocol that allows capability exchange, channel negotiation, switching of media modes and other miscellaneous commands and indications for multimedia communications. SCUI 42 also interfaces to the Q.931 protocol which defines the setup, teardown, and control of H.323 communication sessions. SCUI 42 further interfaces to the Registration, Admission, Status (RAS) protocol that defines how H.323 entities can access H.323 gatekeepers to perform among other things address translation, thereby allowing H.323 endpoints to locate other H.323 endpoints via an H.323 gatekeeper. The H.225 standard-layer 44, which is derived from the Q.931 standard, is the protocol for establishing connection between two or more H.323 terminals and also formats the transmitted video, audio, data and control streams into messages for output to the network interface 34 (e.g., transport over IP network 15). The H.225 layer 44 also retrieves the received video, audio, data and control streams from messages that have been input from network interface 34. As described further below, user application interface 40 which may be a T.120 protocol interface as well as other types of protocol interfaces, also couples to H.225 layer 44.

Figure 3:
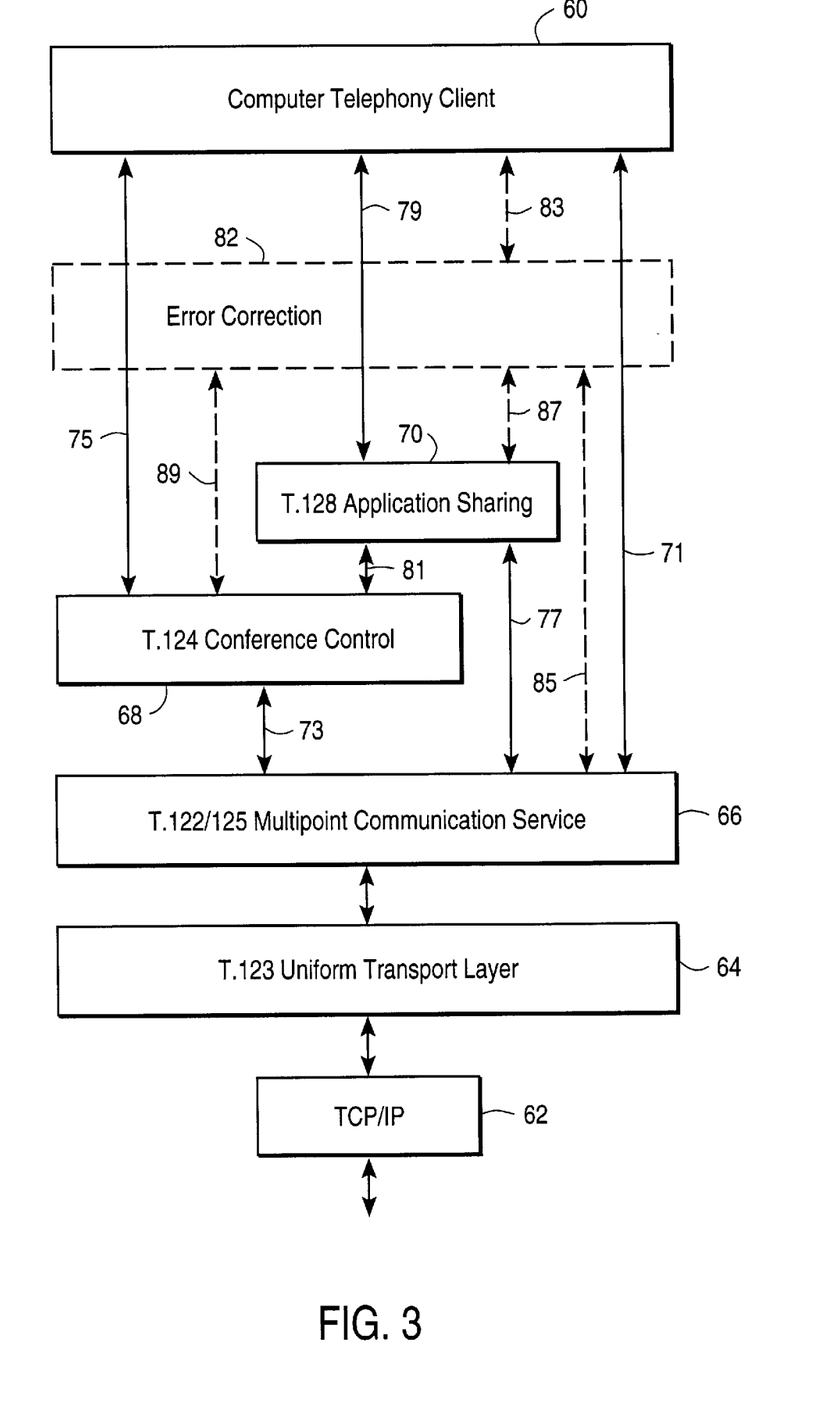
FIG. 3 illustrates the layered logical structure of an exemplary network protocol stack, such as the T.120 series computer network software protocol stack, of computer networking software that also implements the present invention, according to a specific embodiment.

FIG. 3 illustrates the layered logical structure of an exemplary network protocol stack, such as the T.120 series computer network software protocol stack, of computer networking software that also implements the present invention, according to a specific embodiment. In particular, FIG. 3 illustrates the relationship of the invention to this T.120-based protocol stack to a computer telephony client 60 with the lowest protocols shown in the stack being the TCP/IP-related protocols 62. Computer telephony client 60 can be any of a variety of advanced computer telephony products that offer telephony-over-LAN and/or video conferencing features using the T.120 series of protocols. Computer telephony client 60 typically provides the user application interface 40 shown in FIG. 2. A specific embodiment of the present invention for correcting protocol errors in the highest levels of the protocol stack is implemented with a further layer, the error correction layer (indicated in dotted line), in the context of the T.120 series of protocols shown in FIG. 3. Of course, other embodiments may be similar but correct protocol errors for other protocols such as H.323.

As already mentioned, the lowest protocols shown in the stack of FIG. 3 are the TCP/IP-related protocols 62 that include the TCP interface and the TCP and IP layers, which operate respectively at the Session Layer 5, Transport Layer 4 and the Network Layer 3 of the Open Systems Interconnection (OSI) model. The Presentation Layer 6 of the OSI model is not represented in the stack of FIG. 3. Next above the TCP/IP-related layer 62 are the T.120-based series of layers, which operate at the Application Layer 7 of the OSI model. More particularly, the T.120-based layers include a T.123 Uniform Transport layer 64, a T.122/125 Multipoint Communication Service layer 66 above layer 64, a T.124 Conference Control layer 68, and then a T.128 Application-sharing layer 70. As shown in FIG. 3, computer telephony client 60 can interface directly to T.122/125 layer 66, as indicated by line 71. Also, as indicated by lines 73 and 75, computer telephony client 60 can also interface to T.122/125 layer 66 via T.124 Conference Control layer 68 above T.122/125 layer 66. In addition, as indicated by lines 77 and 79, computer telephony client 60 can also interface to T.122/125 layer 66 via T.128 Application-sharing layer 70, which is above layers 66 and 68. Further, as indicated by lines 73, 81 and 79, computer telephony client 60 can also interface to T.122/125 layer 66 via T.124 layer 68 and T.128 layer 70.

As illustrated in FIG. 3, advanced computer telephony client 60 makes sophisticated use of the latest and most complex module, the T.128 module 70, of the illustrated stack. Due to its complexity and recent development, the T.128 layer 70 accounts for the majority of the protocol bugs in the stack. As will be discussed further below, the lower level modules (e.g., T.124 module 78 and T.122/125 module 66) are used in the present invention to correct many of the protocol bugs experienced in the less stable, higher level module (e.g., T.128 module 70). The present invention provides an additional layer 82 on top of the T.120-based layers to correct the T.120-based protocol errors. As seen in FIG. 3, the protocol error correction layer 82 can interface directly to computer telephony client 60, as indicated by dotted line 83. Error correction layer 82 can interface to T.122/125 layer 66 directly as indicated by dotted line 85, or indirectly via other lower T.120-based layers as indicated by a combination of lines. As an example of indirectly interfacing with layer 66, error correction layer 82 can interface to T.122/125 layer 66 via T.128 layer 70, as indicated by dotted line 87 and line 77. Dotted line 87 indicates error correction layer 82 can directly interface with T.128 layer 70. Error correction layer 82 also can interface with T.124 layer 68 directly as indicated by dotted line 89, or indirectly via other lower T.120-based layers as indicated by a combination of lines. As an example of indirectly interfacing with layer 68, error correction layer 82 interfaces with T.124 layer via T.128 layer 70 as indicated by dotted line 87 and line 81. Of course, error correction layer 82 operates at the Application Layer 7 of the OSI model and provides a system builder with the ability to correct T.120-based protocol errors in a timely manner and to provide systems with many features, without being so concerned about T.120-based protocol errors and without being dependent on a third party to correct such protocol errors.

Generally, in the present invention, a data channel as provided by a particular protocol (e.g., T.120) is dedicated to protocol error correction (i.e., a T.120 data channel is designated as the T.120 error correction data channel). Using T.120 as the particular protocol, request/response protocols are run inband across that particular dedicated T.120 error correction data channel and are used to correct errors in an object oriented application programming interface (API) to T.120. The error correction data channel includes versioning support and a standard message prefix in preferred embodiments. The generally described technique of the present invention is applicable to a wide variety of problems that occur after and external to the establishment of a reliable protocol correction channel according to the present invention. The general technique is most applicable to modern distributed object networking technologies because the newer technologies may contain bugs which have not yet been corrected and thus present the most opportunities for error correction. However, the general technique is also applicable to error correction above the Session level (layer 5 of the OSI model) for a wide variety of traditional non-object networking APIs.

Figure 4:
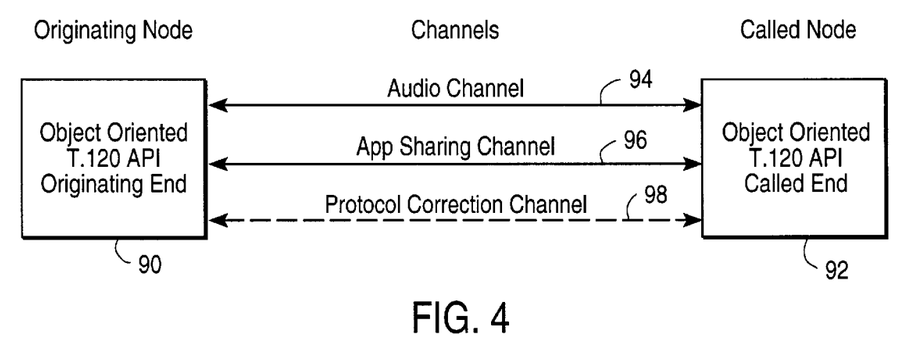
FIG. 4 illustrates the structure and environment of the computer telephony model within which specific embodiments of the present invention operate.

FIG. 4 illustrates the structure and environment within which a specific embodiment of the present invention operates. More specifically, FIG. 4 provides a computer telephony model useful to explain some of the problems solved by the present invention in accordance with the specific embodiment relating to T.120 error correction. This depiction of the system is based on an object-level API view. Such distributed object models are based heavily on the concept of software interrupts to report on events and to signal when other actions may begin. For a computer application such as application sharing, hundreds of these software interrupts (or notifications) may be supported (examples of software interrupts include: user has moved mouse, communication established, share mode selected, collaboration mode selected, user has signed off, etc.). As a result of this complexity, programming bugs may be introduced into the programming code. Because of these bugs, some of the protocol interrupts/notifications which should be issued may not be issued, and some protocol interrupts/notifications which should not be issued may be issued in error. As described in detail below, these types of protocol errors may be easily corrected by the present invention which provides a protocol correction channel.

Figure 1:
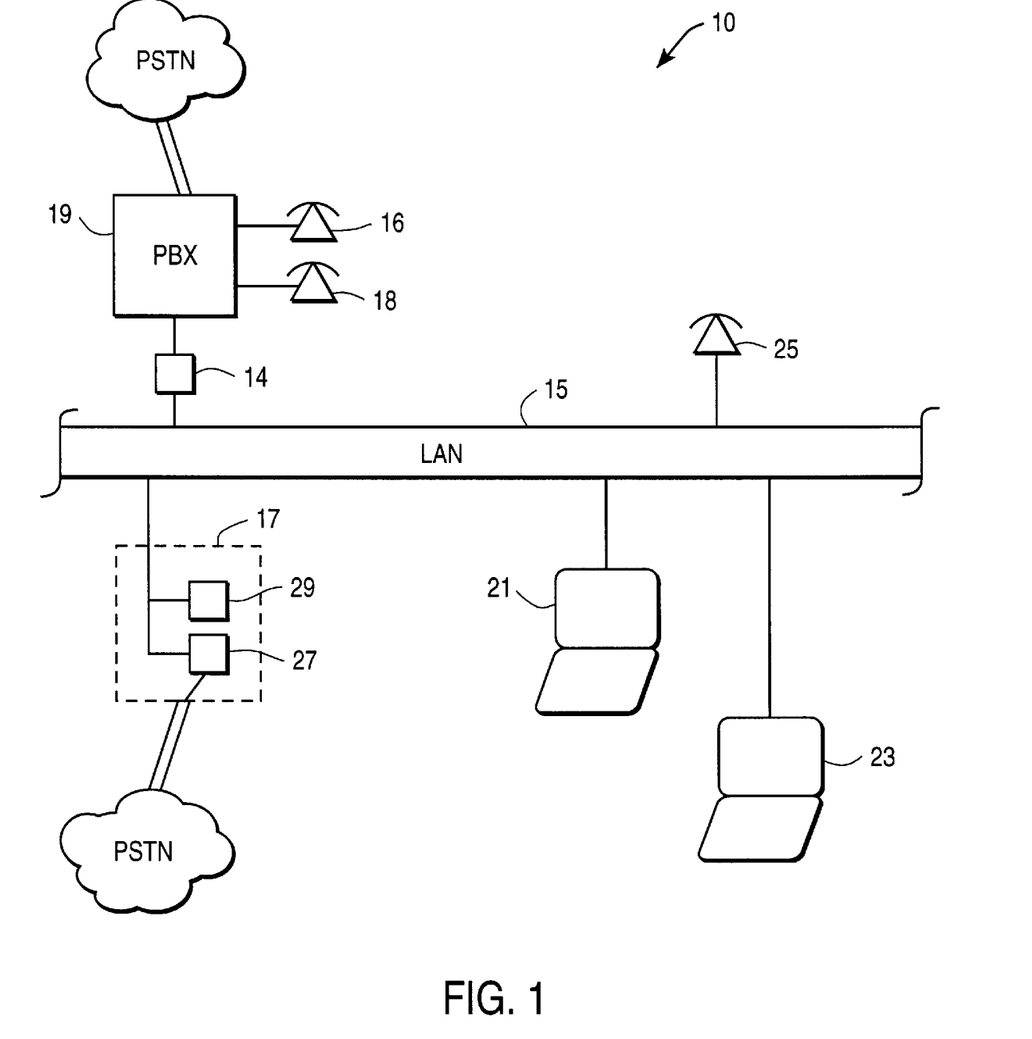
FIG. 1 is a schematic diagram of an exemplary network system, such as an H.323 system, for providing data and voice services.

In the logical model shown in FIG. 4, two nodes (e.g., any two of H.323 computer telephony devices 21, 23, or H.323 telephony device 25 of FIG. 1) are connected via channels over a computer network. These channels exist over the network between an originating node 90 and the called node 92 during a voice-data call in progress. The T.120 protocol series provides T.120-based application sharing (i.e., T.128 application-sharing layer 70 in FIG. 3), in which a user on the originating node 90 selects a particular application, from a list of shareable applications, that is intended to be shared in a read-only mode with the user on the called node 92. In this example, specifically, a two-way H.323 audio channel 94 and a T.120 application-sharing channel 96 exist over the network between the originating and the called nodes during the call in progress. In accordance with the present invention, a dedicated protocol error correction channel 98 such as the T.120-based protocol correction channel also is provided over the network between the originating and called nodes 90 and 92. As generally described above, the purpose of protocol error correction channel 98 is to carry all data necessary to correct protocol errors in the application-sharing channel 96, to thereby provide inband protocol error correction (in this specific embodiment, T.120 protocol error correction).

As described in further detail below, various specific embodiments of the present invention solve the problems presented by a missing interrupt/notification and an incorrectly issued interrupt/notification, which are discussed in the context of T.120-based application sharing.

Figure 5:
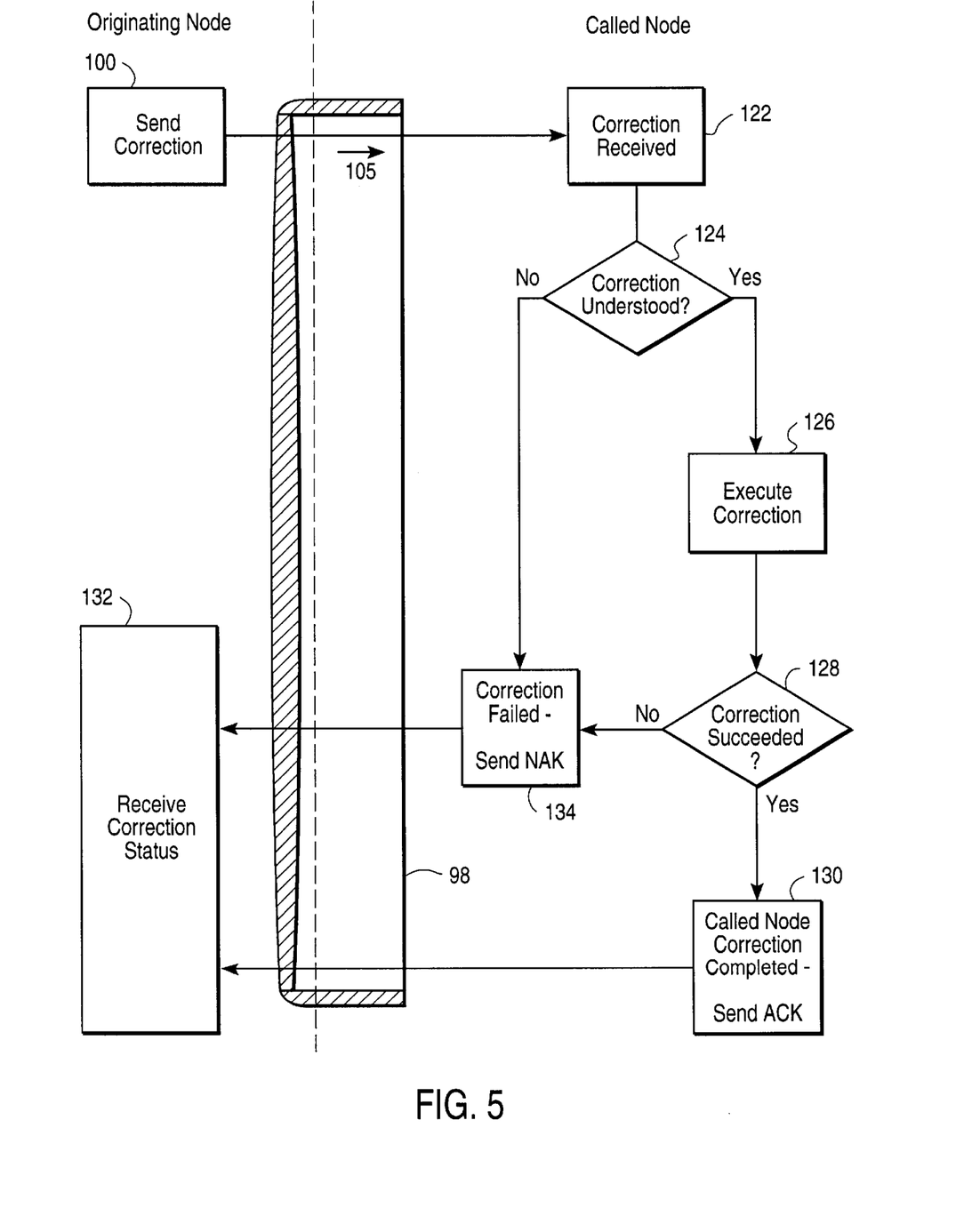
FIG. 5 is a protocol process flow diagram for the one-phase correction protocol of error correction layer 82, according to a specific embodiment of the present invention.
Figure 6:
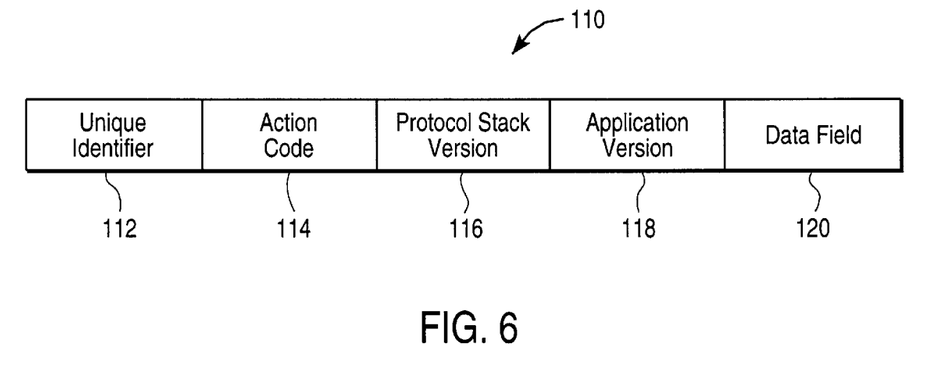
FIG. 6 illustrates a general message format that is used in the specific embodiments of the present invention.
Figure 7:
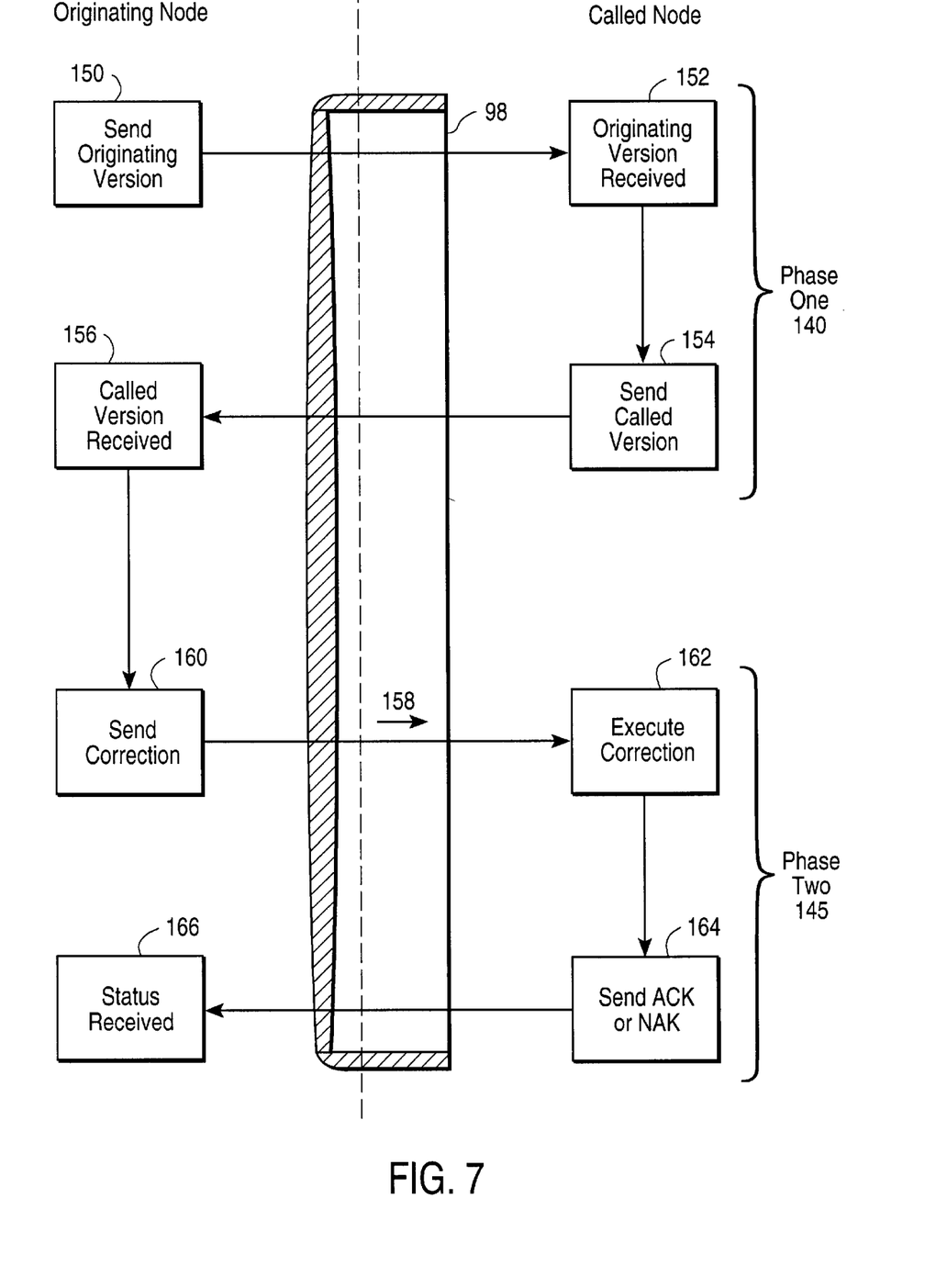
FIG. 7 is a protocol process flow diagram for the two-phase correction protocol of error correction layer 82, according to another specific embodiment of the present invention.

One type of protocol error that can be resolved with the present invention is the lost software interrupt or missing notification. For example, from the perspective of the programmer of a client graphical user interface (GUI), a software interrupt issued on the called end 92 is essential to knowing on that called end that an application has been shared and that the shared application, although visible at the originating and called ends, may not be modified on the called end. If the software interrupt/notification indicating a shared application is not issued, then the user on the called end will not receive proper notification of the sharing state. FIG. 5 is a protocol process flow diagram for the one-phase correction protocol of error correction layer 82 that may resolve this type (lost software interrupt/notification) of error, according to a specific embodiment of the present invention. FIG. 6 illustrates a general message format that is used in the specific embodiments of the present invention. Of course, other message formats besides the exemplary format shown in FIG. 6 may be used in other specific embodiments. FIG. 7 is a protocol process flow diagram for the two-phase correction protocol of error correction layer 82 that may resolve this type of error (lost software interrupt/notification), according to another specific embodiment of the present invention.

The one-phase correction protocol flow as illustrated in FIG. 5 corrects a protocol stack defect, such as a situation when a T.120-based application-sharing interrupt/notification is missing at the called node 92. Whenever the user at an originating node 90 locally invokes (e.g., by selecting a predetermined button) read-only application sharing, the T.128 application-sharing module 70 when operating properly should issue a software interrupt/notification to both nodes to indicate that an application is to be shared. However, when this notification is missing and never received at the called node due to a programming bug, the present invention provides a send correction routine that is called by originating node 90, and the called routine builds a Protocol Correction message 105. The originating node sends in step 100 this Protocol Correction message 105 to called node 92. This message 105 created by the send correction routine is sent via the T.120 data channel, established when T.120 was initialized, that had been dedicated as the T.120-based error inband correction channel 98 (FIG. 4).

FIG. 6 illustrates the general format 110 of the messages, such as Protocol Correction message 105, sent in accordance with various specific embodiments of the present invention. In addition to Protocol Correction messages, message format 110 also applies to response messages described below. More particularly, the general message format 110 consists of an Unique Identifier (UID) field 112 for the message, an Action Code field 114, a Protocol Stack Version Number field 116 (e.g., a T.120 stack version number), an Application Version Number field 118, and a variable length Data field 120. The Action Code field 114 contains a particular unique action code that designates the message as one that is to be decoded by the receiving node, another particular unique action code that designates the message as one which is merely to be interpreted by the receiving node as an acknowledgment (ACK) response message, or another particular unique action code that designates the message as one which is to be interpreted by the receiving node as a negative acknowledgment (NACK) response message. Fields 116 and 118 identify the particular protocol stack version number and the particular application version number, respectively, that are being used by the sending node. The Data field 120 includes the actual information or payload for the particular message being sent. The UID field 112 is a unique sequence that uniquely identifies the particular Protocol Correction message between particular nodes and any ACK or NACK response message associated with responding to that particular Protocol Correction message. Different particular UID sequences can be used to support multiple media in the same protocol error correction channel 98, and/or to support multiple channels of the same media in the same correction channel 98. The UID in a message is especially useful for response messages to Protocol Correction messages in multipoint or multichannel situations. In a specific embodiment, for example, the UID field 112 is a 32-bit sequenced unique identifier; the Action Code field 114 is 32 bits; Protocol Stack Version Number field 116 and Application Version Number field 118 each is 20 bytes; and the length, structure and contents of the Data field 120 would be particular to each type of action code.

The above-described general message format is preferably consistently used for all messages in some specific embodiments, because the common basic message format and the common request/response protocol facilitate the extension, supporting and debugging of the protocol error corrections. However, some specific embodiments may use different formats (such as not using or adding some fields in the general format, depending on the type of message being sent) on an ad hoc basis. However, the present invention is able to transmit error correction information from one node to another node across a reliable channel (e.g., the inband protocol correction channel). Thus, a protocol problem or omission may be reliably corrected, preferably in an inband manner, so that the integrity of the overall protocol is not compromised.

Returning to FIG. 5, after the originating node sends in step 100 Protocol Correction message 105 to called node 92 via the dedicated T.120-based error correction channel 98 (shown as a pipe), the called node receives Protocol Correction message 105 in step 122. The Action Code field 114 of message 105 has a predetermined code value that indicates to the called node that the message 105 is to be decoded. In this example, the Data field 120 includes information that the read-only application-sharing mode is being invoked by the originating node. The called node then determines whether or not it understands the Protocol Correction message 105 in step 124. The called node may not understand the Protocol Correction message 105 if, for example, the application software (and/or the protocol version) on the originating node is a newer version (possibly the newer version may also have additional action codes not provided in the older version) than the version used by the called node and contains an unrecognized or new action code.

If in step 124, the called node determines that it understands the Protocol Correction message 105, then the called node in step 126 attempts to execute the correction (in this example, the called node attempts to initiate the software interrupt/notification indicating that the read-only application sharing has been invoked). It should be recognized that in some embodiments the correction can be hard coded and thus applicable to all environments. In other embodiments, the correction can consist of executable code transferred across the correction channel 98 in those environments that support such operations (for example, such downloading may be practical if the error of interest is being corrected at the browser level and the customer's security environment permits such operations).

If the correction is executed successfully as determined in step 128, then the called node in step 130 issues an ACK response message to the originating node and the originating node receives the ACK response message indicating the correction status in step 132. The ACK response message includes the appropriate action code in field 114 that accordingly identifies the message as an acknowledgment response, and the same contents in UID field 112 as in the Protocol Correction message 105. However, if it is determined in step 128 that the correction has not been successfully executed for any reason (including, for example, a shortage of memory at the receiving node that would prevent successful execution of the error correction), then the called node in step 134 issues a NACK response message to the originating node and the originating node receives the NACK response message indicating the correction status in step 132. The NACK response message includes the appropriate action code in field 114 that identifies the message as a negative acknowledgment response, and the same contents in UID field 112 as in the Protocol Correction message 105.

If in step 124, the called node determines that it does not understand the Protocol Correction message 105 for any reason, then the called node in step 134 issues a NACK response message to the originating node and the originating node receives the NACK response message indicating the correction status in step 132. If the Protocol Correction message 105 is not understood because the application software (and/or protocol stack) on the originating node is a newer version than the version used by the called node and contains an unrecognized new action code, then the NACK response message includes the same contents in UID field 112 as in the Protocol Correction message 105, and further includes the application software (and/or protocol stack) version number in field 118 used by the called node. Given this version number information of the called node from the NACK message, the originating node having the newer version of application software (and/or protocol stack) can appropriately deal with initiating the process of upgrading the called node.

In accordance with another specific embodiment of the present invention, a two-phase correction protocol flow as illustrated in FIG. 7 also can be used to correct a protocol stack defect like a missing software interrupt or notification. As an example, the two-phase correction protocol flow is described for the situation when a T.120-based application-sharing interrupt/notification is missing at the called node 92. Whenever the user at an originating node 90 locally invokes (e.g., by selecting a predetermined button) read-only application sharing, the T.128 application-sharing module 70 issues a software interrupt/notification to indicate that an application is to be shared, and the present invention provides for the occurrence of the flow of FIG. 7. As seen in FIG. 7, phase one 140 of the two-phase correction protocol includes an exchange of version information between the originating and called nodes 90 and 92 via the protocol error correction channel 98, and phase two 145 of the two-phase correction protocol includes the actual correction flow (such as substantially the detailed correction flow described above in the one-phase correction for FIG. 5).

In phase one 140, the originating node in step 150 sends via correction channel 98 (shown again as a pipe) the version information of the originating node in a first phase-one message to the called node. This first phase-one message has the general message format 110 described in FIG. 6, with an unique UID 112; an action code in field 114 indicating the message as a phase-one communication; and fields 116 and 118 containing the version information of the originating node. Then in step 152, the called node receives and makes note of the version information for the originating node from the first phase-one message. The called node then in step 154 sends the version information for the called node in a second phase-one message to the originating node. The second phase-one message has the general message format 110 described in FIG. 6, with the same unique UID 112 as the first phase-one message had; an action code in field 114 indicating the message as a phase-one communication; and fields 116 and 118 containing the version information of the called node. The originating node receives and makes note of the version information of the called node in step 156.

Once the originating and called nodes know the version information of the other from the first and second phase-one messages, the nodes then appropriately tailor the messages they exchange in phase two 145. In some specific embodiments, if one of the nodes uses a newer software version than that of the other node, then after phase one 140 each node sets the standard for the lowest common denominator correction functions that the nodes may invoke. In other embodiments, the node using the newer software version can initiate an upgrade of the other node. The UID 112 for phase-two messages is the same UID used in phase-one messages for a particular error correction message in a particular connection between nodes.

In phase two 145, the originating node sends a Protocol Correction phase-two message 158 to the called node in step 160. The Protocol Correction phase-two message 158 has the general message format 110 described in FIG. 6, with the same unique UID 112 as the phase-one messages had, and an action code in field 114 indicating the message as a phase-two Protocol Correction message that should be decoded. Fields 116 and 118 may be disregarded, since the version information was previously exchanged in phase one 140. The data field 120 of the Protocol Correction phase-two message 158 is embedded with the particular protocol error correction information (e.g., hard coded correction). Upon receiving the Protocol Correction phase-two message 158, the called node executes the correction in step 162. The called node in step 164 then sends an ACK response message if the correction was successfully executed, or a NACK response message if the correction was not successfully executed. Having the general message format 110 described in FIG. 6, the phase-two ACK response message would have the same unique UID 112 as the Protocol Correction message 158 had, and an action code in field 114 indicating the message as an ACK response message. Again, fields 116 and 118 may be disregarded. Having the general message format 110 described in FIG. 6, the phase-two NACK response message would have the same unique UID 112 as the Protocol Correction message 158 had; an action code in field 114 indicating the message as a NACK response message. Fields 116 and 118 would again be disregarded. Although not described or specifically shown in phase two 145 in FIG. 7, a substantially similar process flow as shown and described for steps 122, 124, 126, 128, 130 and 134 in FIG. 5 occurs in steps 162 and 164 in FIG. 7. The originating node in step 166 then receives the message sent by the called node to obtain the correction status.

The two-phase correction protocol of this specific embodiment can result in an efficient implementation of correction in those cases where more than a moderate number of remote correction operations need to be performed. This increased efficiency becomes particularly important as the number of nodes connected in a multipoint environment increases. It should also be noted that the downloadable executable code mentioned above for the one-phase correction embodiment may be included in the data field of the Protocol Correction phase-two messages of the two-phase correction embodiment in some embodiments if the environment is compatible with the downloadable executable code.

As described above, the common protocol error scenario of the lost software interrupt/notification is easily handled by specific embodiments of the present invention. Another common protocol error scenario that is addressed by the present invention is the software interrupt/notification issued incorrectly or by mistake. For example, the timing of the issuance of a software interrupt may have been in error, or a software interrupt may have been issued in a case where the interrupt should not have been issued at all. For example, from the perspective of the programmer of a client GUI, an incorrectly issued software interrupt indicating read-only application sharing at the called end 92 will mistakenly indicate that a particular application has been shared on the called end (that is the particular application is visible in a software window but may not be modified on the called end in this shared mode). This incorrectly issued application-sharing notification may cause a confusing and/or incorrect user interface to appear.

Figure 8:
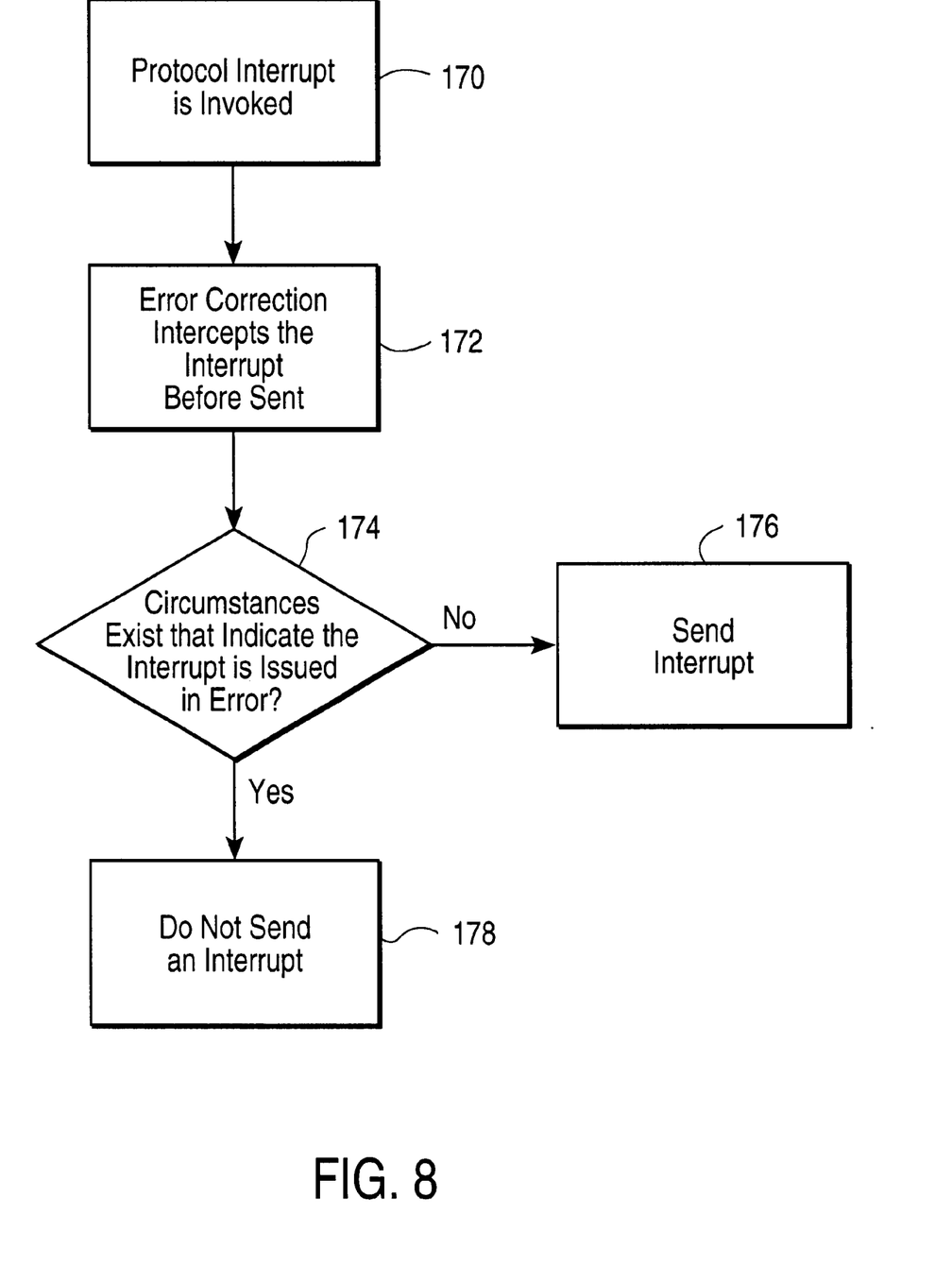
FIG. 8 is a flow diagram illustrating the operation of error correction layer 82 to address mistakenly issued interrupts/notifications, according to the specific embodiment.

In accordance with a specific embodiment, the present invention corrects errors of this general class (mistakenly issued interrupts/notifications) as follows. FIG. 8 is a flow diagram illustrating the operation of error correction layer 82 (see FIG. 3) to address at least a class of protocol errors (mistakenly issued interrupts/notifications) that are known to sometimes cause problems, according to the specific embodiment. This known class of protocol errors may be a small percentage of the total protocol errors. Conventionally, whenever a protocol interrupt, such as a T.120-based interrupt, is invoked, this software interrupt is immediately sent to the appropriate nodes. However, programming bugs may be in the T.120-based program code so that an interrupt is sent when it is not indicated. Therefore, the error correction layer of the present invention is invoked whenever an error-prone protocol interrupt (such as a T.120-based interrupt in the example used to describe this embodiment) is issued by the higher protocol layers above the session layer. In particular, if a T.120-based protocol interrupt is invoked (e.g., by the user selecting a particular feature button or taking a selected action) in step 170, the error correction layer in step 172 intercepts the T.120-based protocol interrupt before it is sent to the user process. That is, the error correction layer executes a return from the T.120-based protocol interrupt routine prior to any sending of this interrupt (thereby effectively ignoring the issued interrupt). Then in step 174, the error correction layer determines whether any of a unique set of predetermined circumstances exist that indicate that the particular interrupt was invoked in error. A particular set of predetermined circumstances may be able to indicate the presence of a particular interrupt sent in error, and a group of such sets can be programmed to indicate that an interrupt invoked in error exists. If it is determined in step 174 that such circumstances do not exist that indicate that this interrupt is an error, then the error correction layer proceeds in step 176 to send the interrupt to the user process. However, if it is determined in step 174 that such circumstances indicating an interrupt invoked in error do not exist, then the error correction layer as indicated in step 178 does nothing further and thus the interrupt is not sent. Therefore, an interrupt that would have issued in error due to a programming bug in the higher protocol stack is prevented from issuing by the error correction layer of the present invention. This aspect of protocol error correction layer 82 can of course be integrated into the one-phase or two-phase embodiments discussed above, so that the problems of lost interrupts and incorrectly issued interrupts are resolved.

From the above description, it is seen that the present invention provides support for different versions of software, for multipoint/multicast operation, and other features. The specific embodiments described above in the context of T.120-based protocol error correction can be extended to other complex protocols such as H.323 for other specific embodiments by using the inband data transfer capabilities of such complex protocols as a signaling channel to correct errors in other aspects of that protocol. For example, similar request/response protocols and message formats are also applicable for H.323 as for T.120. The specific embodiments preferably use an inband correction channel to correct protocol errors in other higher level parts of the protocol, and problems that could arise in attempting protocol error correction outside of the protocol, such as firewall problems, are avoided. However, other specific embodiments may use other channels such as H.450 to provide this error correction channel functionality in some situations.

What is claimed is:

1. A method of correcting a protocol error in a computer networking protocol stack used in a communication connection across a network between a first node and a second node, said method comprising:

establishing a data channel for use as a protocol error correction channel across said network;

generating a protocol error correction message to correct said protocol error;

sending said protocol error correction message over said data channel to said second node;

receiving said protocol error correction message at said second node;

sending a protocol error correction response message to said first node to inform said first node of a status of said protocol error.

2. The method of claim 1, further comprising executing said protocol error correction message at said second node; and wherein said protocol error correction response message comprises either an acknowledgment message to indicate successful execution of said protocol error correction message or a negative acknowledgment message to indicate unsuccessful execution of said protocol error correction message.

3. The method of claim 1, wherein said data channel provides an inband protocol error correction to said protocol error of said networking protocol stack.

4. The method of claim 1, wherein said computer networking protocol stack is a T.120-based series protocol or H.323-based protocol.

5. The method of claim 1, wherein said protocol error correction message and said protocol error correction response message include the same unique identifier for a particular one of said communication connection between said first and second nodes for a particular one of said protocol error correction message.

6. The method of claim 5, wherein said communication connection between said first and second nodes is part of a multipoint or multicast communication network between said first node and a plurality of nodes, said plurality of nodes including said second node; and wherein a plurality of data channels are used as protocol error correction channels across said network between said first node and said plurality of nodes.

7. The method of claim 6 wherein said protocol error correction message is sent over said data channel to said plurality of nodes; said protocol error correction message is received at said plurality of nodes; and wherein said plurality of nodes send protocol error correction response messages to said first node to inform said first node of a status of said protocol error at said respective one of said plurality of nodes.

8. The method of claim 5, wherein said protocol error correction message and said protocol error correction response messages include different unique identifiers for different particular media types of said communication connection between said first and second nodes, wherein said communication connection comprises a multimedia communication.

9. The method of claim 5, wherein said protocol error correction message and said protocol error correction response message include different unique identifier for different multiple channels of the same media type for said communication connection between said first and second nodes.

10. The method of claim 1, further comprising:

determining if a protocol interrupt invoked by one of said first or second nodes has been invoked in error; and sending said protocol interrupt only if it is determined that said protocol interrupt has not been invoked in error.

11. The method of claim 1, wherein said protocol error correction message comprises downloadable executable code.

12. The method of claim 1, wherein said method is a one-phase correction.

13. The method of claim 12, further comprising:

exchanging version information messages across said data channel.

14. The method of claim 13, further comprising:

tailoring said protocol error correction message to the lowest common denominator correction functions supported by the oldest software version of one of said first or second nodes.

15. The method of claim 1, wherein said protocol error correction message generation step, said protocol error correction message sending step, said protocol error correction message receiving step, and said protocol error correction response message sending step comprise the second part of a two-phase correction, and a first part of said two-phase correction comprises exchanging version information messages across said data channel.

16. A computer program product for correcting a protocol error in a computer networking protocol stack used in a communication connection across a network between a first node and a second node, said computer program product comprising:

computer-readable program code for establishing a data channel for use as a protocol error correction channel across said network;

computer-readable program code for generating a protocol error correction message to correct said protocol error;

computer-readable program code for sending a protocol error correction message over said data channel to said second node;

computer-readable program code for receiving said protocol error correction message at said second node; and computer-readable program code for sending a protocol error correction response message to said first node to indicate a status of said protocol error; and computer-readable media for storing said computer-readable program codes.

17. The computer program product of claim 16, wherein said data channel provides inband protocol error correction to said protocol error of said networking protocol stack.

18. A system for correcting a protocol error in a computer networking protocol stack used in a network including a first node and a second node, said system comprising:

a data channel established for use as a protocol error correction channel, said data channel being inband to said computer networking protocol stack;

first computer-readable program code generating and sending a protocol error correction message from said first node to said second node over said data channel when a protocol notification signal is not issued at said second node, said protocol notification signal being part of said computer networking protocol stack;

second computer-readable program code intercepting said protocol notification signal when said protocol notification signal is determined to be issued in error; and computer-readable media for storing said first and second computer-readable program code.

19. The system of claim 18, wherein said first computer-readable program code further sends a protocol error correction response message from said second node to said first node over said data channel to indicate a status of said protocol error.

20. The system of claim 18, wherein said first computer-readable program code further sends software version information messages between said first and second nodes.

* * * * *